United States Patent
Beaty et al.

(10) Patent No.: US 7,453,632 B2
(45) Date of Patent: Nov. 18, 2008

(54) PROJECTION SCREEN COATING

(76) Inventors: Peter Beaty, 12524 S. Central Park Avenue, Alsip, IL (US) 60803; Roland Maurice Boughton, 112 Sadik Cove, Byhalia, MS (US) 38611

( * ) Notice: Subject to any disclaimer, the term of this patent is extended or adjusted under 35 U.S.C. 154(b) by 174 days.

(21) Appl. No.: 11/282,459

(22) Filed: Nov. 19, 2005

(65) Prior Publication Data

US 2007/0115546 A1    May 24, 2007

(51) Int. Cl.
   *G03B 21/56* (2006.01)
(52) U.S. Cl. ........................................... 359/443
(58) Field of Classification Search ................. 359/443, 359/452, 449, 459
   See application file for complete search history.

(56) References Cited

U.S. PATENT DOCUMENTS

| 1,998,054 | A | * | 4/1935 | McBurney | 359/452 |
| 6,011,643 | A | * | 1/2000 | Wunderlich et al. | 359/279 |
| 6,144,491 | A | * | 11/2000 | Orikasa et al. | 359/452 |
| 6,650,472 | B1 | * | 11/2003 | Adachi et al. | 359/453 |
| 6,836,361 | B2 | * | 12/2004 | Hou | 359/443 |
| 6,961,175 | B2 | * | 11/2005 | Toda et al. | 359/452 |
| 7,248,406 | B2 | * | 7/2007 | May et al. | 359/452 |
| 2005/0128581 | A1 | * | 6/2005 | Samuels et al. | 359/443 |

* cited by examiner

*Primary Examiner*—Christopher Mahoney
(74) *Attorney, Agent, or Firm*—Ice Miller LLP

(57) ABSTRACT

A projection screen for displaying an image projected as a combination of primary colors, the projection screen comprising a coating applied to a substrate. The coating contains one or more pigments whose colors correspond to the primary colors.

20 Claims, 1 Drawing Sheet

PROJECTION SCREEN COATING

BACKGROUND OF THE INVENTION

This invention relates to projection screens for displaying projected images, and, more particularly, to coating compositions used for projection screens.

Projection screens for displaying projected images are well known in the art. Such projection screens include, for example, white fabric front projection screens. A typical flat surface, like, for example, a wall, may also serve as a projection screen. A projection screen diffuses the light generated by a projector, providing for the display of a projected image which is reflected back to the viewer. It is desired that a projection screen provides for display of a projected image, and that the projected image has optimal quality, clarity, and appeal. However, projected images displayed on conventional projection screens are typically dull, lacking vivid color, adequate brightness, and good contrast.

The image quality of a projected image also decreases as the overall brightness of the room increases. Generally, low light or dark conditions are required for viewing a projected image. In contrast, in daylight or in a well-lit room, it is often difficult to view a projected image as the projected image fades and becomes indistinct. In such daylight or well-lit lighting conditions, if a projected image is able to be viewed, the projected image is typically pale and lacks adequate brightness and contrast. One way to overcome the problems of viewing projected images in a daylight or well-lit room is to decrease the ambient light in the room where the projected image is being viewed. A decrease in ambient light may be achieved in a room that does not have windows (like a movie theater), but is not always possible, such as, for example, when viewing a projected image in an room where ambient light is required for other functions in the room, or where it is not possible to adequately block light entering the room from windows. In addition to the foregoing, conventional projection screens are typically bulky, difficult to install, and relatively expensive. In summary, current projection screen technology for display of projected images is less than optimal in a variety of environments.

Thus, there is a need for a projection screen that can display a projected image with the projected image having optimal quality, clarity, brightness, and overall appeal. There is also a need for a projection screen that permits accurate reproduction of projected images under a variety of lighting conditions, including daylight conditions or well-lit conditions. Furthermore, there is a need for a projection screen that is inexpensive and easy to install.

BRIEF SUMMARY OF THE INVENTION

These needs and other needs are satisfied by the present invention, which comprises a projection screen for displaying an image projected as a combination of primary colors. The projection screen includes a coating for displaying the projected image and a substrate for receiving the coating. The coating comprises one or more primary pigments, each primary pigment corresponding to one of the primary colors. The coating may further comprise one or more reflective pigments and a transparent medium.

In one embodiment, the primary colors are red, blue and green, and the primary pigments comprise a red pigment, a blue pigment and a green pigment. The coating may further contain reflective pigments, comprising a red reflective pigment and a yellow reflective pigment. The transparent medium may comprise a urethane. The substrate has a mirrored surface, and the coating is located directly on the mirrored surface.

These and other features, aspects, compositions, and advantages of the present invention will become better understood with reference to the following description and appended claims.

DETAILED DESCRIPTION OF THE INVENTION

Figure 1:
FIG. 1 shows an image simultaneously projected onto a conventional projection screen (left) and a projection screen embodying the present invention (right), under ambient lighting conditions equivalent to 20,000 foot candles.

A projection screen is described, comprising a substrate with a coating on which projected images are displayed. Color images are commonly projected as a combination of primary colors—e.g., red, green and blue. The range of colors in the image is reproduced by varying the combination and intensities of the red, green and blue lights. The projection screen coating contains one or more selected "primary" pigments whose colors correspond to the projected primary colors. For example, where the image is projected using the primary colors red, green and blue, the coating preferably contains a mixture of red, green and blue primary pigments.

The selection of primary pigments that correspond to the projected primary colors provides improved visibility and contrast of the projected image under normal lighting conditions, such as daylight or a well lit room. In general, the red, green and blue primary pigments will respectively enhance the coating's reflection of red, green and blue light over other colors. As a result, the coating will- tend to enhance the reflection of the projected image over ambient white light, thereby improving the visibility and contrast of the projected image under normal lighting conditions. In contrast, conventional white projection screens do not discriminate against ambient white light, which can obscure and reduce the contrast of the projected image. Those of skill in the art will appreciate that it is possible to select alternative primary pigments for use with images projected using alternative primary colors, such as cyan magenta and yellow.

Various types of colorants may be used as primary pigments in the coating, including paints, dyes, inks and other colorants known in the art. Where the image is projected using the primary colors red, green and blue, the primary pigments preferably comprise a mixture of red, green and blue paints. In a most preferred embodiment, the primary pigments comprise the commercially available acrylic paints: Delta Ceramcoat Tompte Red #02107, Delta Ceramcoat Pthalo Blue #02502 (Delta Technical Coatings Inc., Whittier, Calif.) and Galeria Phthalo Green (Winsor & Newton, Wealdstone, England).

A white pigment may be added to the coating to increase the reflectivity or gain of the projection screen across the entire color spectrum, and the perceived brightness of the projected image. The white pigment further serves as a base that binds together the primary pigments and any other components of the coating. In a preferred embodiment, the white pigment is a white paint and most preferably the commercially available paint: Behr Ultra Pure White Flat Acrylic Latex (Behr Process Corp., Santa Ana, Calif.).

Other base pigments may be added to coating to enhance the gain of the projection screen, including pigments containing reflective particles such as mica. In a preferred embodiment, the base pigment further contains the commercially available paints: Delta Ceramcoat Pearl Finish #02601 and Delta Ceramcoat Metallic Silver #2603 (Delta Technical Coatings Inc., Whittier, Calif.). The Pearl Finish paint contains white reflective mica particles that increase the gain of the projection screen across the entire color spectrum. The Metallic Silver paint similarly contains silver reflective mica particles that increase the gain of the projection screen across the entire color spectrum, but at a slightly darker color shift for accurate reproduction of colors at the darker end of the spectrum. The Pearl Finish and Metallic Silver paints also serve as a base that binds together the primary pigments and any other components of the coating.

The combination of the primary pigments and white base pigments typically results in a grey colored projection screen, which can cause the colors in the projected image to be shifted toward the dark end of the spectrum—e.g., red becomes dark red. Thus, other pigments may be added to the coating to correct any imbalance in the color and brightness of the projected image. Such color corrective pigments may contain reflective particles to selectively enhance the reflectivity or gain of the projection screen and the perceived brightness of the projected image with respect to certain colors. In a preferred embodiment, such color corrective pigments comprise the commercially available paints: Delta Ceramcoat Metallic Red Copper #02605, Delta Ceramcoat Antique Gold #02002, Delta Ceramcoat Metallic Pale Gold #02624 (Delta Technical Coatings Inc., Whittier, Calif.), and Plaid Folk Art Metallic Inca Gold #676 (Plaid Enterprises Inc., Norcross, Ga.).

In particular, the Metallic Red Copper paint contains red reflective mica particles that increase the gain of the projection screen with respect to the red tones in the projected image, thereby minimizing the shift of red colors toward dark reds and enhancing the reproduction of vivid reds, light reds, vivid oranges and flesh tones. The Antique Gold paint assists in the correct reproduction of yellow colors in the projected image—such as in the reproduction of flesh tones, yellows, light greens and light browns. The Metallic Pale Gold and Metallic Inca Gold paints contain yellow reflective mica particles that increase the gain of the projection screen with respect to the yellow tones in the projected image, thereby minimizing the shift of yellow colors toward dingy yellows and enhancing the reproduction of vivid yellows, light yellows, light greens.

The projection screen is formed by applying the coating to the surface of a substrate by spraying, brushing, rolling or by other means known in the art. The coating may be applied to variety of different substrates, including metal, wood, plastic and glass. Where the substrate is made of an opaque material, the projection screen is necessarily used as a front projection screen. However, where the substrate is made of a transparent material, such as transparent plastic or glass, the projection screen may be adapted for use as a rear projection screen.

The surface of the substrate for receiving the coating is preferably flat, smooth and featureless, without any noticeable deformations or texture. However, those of skill in the art will appreciate that it is possible to apply the coating to a surface that is curved and/or textured, as may be required by the application. In addition, where the coating is applied to a substrate made of a flexible material—e.g., to allow the projection screen to be rolled up, folded or otherwise deformed—the coating may contain one of various flexative agents known in the art, to prevent chipping or cracking of the coating. In a preferred embodiment, the substrate is flat aluminum sheeting having a brushed, anodized, mirrored or matte finish.

In a most preferred embodiment, the coating is applied to a substrate having a reflective or mirrored surface. As the light from the projected image strikes the coating, a portion of the light is not reflected back to the viewer, but is transmitted through the coating to the surface of the substrate. Where the substrate is an opaque material, the transmitted light is largely absorbed and does not contribute to the projected image. However, where the surface of the substrate is reflective, the transmitted light is reflected back through the coating toward the viewer and further enhances the gain of the projection screen. Furthermore, because this reflected light passes back through the coating, the light from the projected image will be enhanced over ambient white light.

In the case where the mirrored surface comprises a silvered glass or plastic sheet, such as a traditional glass mirror having one side painted with pure aluminum, the coating will be separated from the mirrored aluminum by the thickness of the glass or plastic. The light from the projected image transmitted through the coating must travel through the thickness of the glass as it is reflected back through the coating. If the layer of glass or plastic is too thick, directional refraction of the reflected image may occur, creating a double-image on the projection screen. To reduce the problem of directional refraction, it is preferred that the glass or plastic layer have a thickness of 0.11 inches or less, and most preferably that the coating be applied directly to the reflective surface, such as a reflective mylar, without an intervening layer of glass or plastic.

The coating may contain a transparent (or semi-transparent) medium to assist the transmission of light, such as Behr Deep Base 1300 Acrylic Latex. The Deep Base is a colorless, transparent, tintable paint having a matte finish. The addition of Deep Base increases the transparency of the coating, and reduces the undesirable sheen of the metallic paints or other additives in the coating that may cause the reflection of a light source as a bright white spot, also referred to as "hotspotting." The Deep Base also serves as a thickening agent to provide the necessary viscosity for use in spraying equipment. Depending on the type of pigments used in the coating, an appropriate solvent, such as distilled water, may also be used as a thinning agent to adjust the viscosity of the coating.

The transparent medium may also comprise a semi-clear, semi-transparent hardener, such as urethane, polyurethane or spar urethane, and most preferably Minwax Polyacrylic Water Based Polyurethane Clear Satin (Minwax Co., Upper Saddle River, N.J.). In alternative embodiments, other transparent hardeners may be used, including lacquers, varnishes, shellacs, resins and nitrocellulose may also be used. In addition to increasing the transparency of the coating, the hardener also serves to suspend the individual pigment particles in a transparent medium, even after the coating is cured, thereby enhancing the properties of the both the primary pigments and corrective pigments within the coating. In particular, reflective particles are able to assume random orientations within the transparent medium, thereby enhancing diffusion of the projected image by the projection screen. In the absence of a hardener, the reflective particles tend to assume a uniform orientation that reflects light directly back toward the projector.

The following composition is illustrative of a preferred embodiment of the projection screen coating.

| Component | Amount |
| --- | --- |
| Red Pigment | 0.5-5 oz. |
| Green Pigment | 0.25-5 oz. |
| Blue Pigment | 0.10-5 oz. |
| Yellow/Gold Pigment | 0.25-5 oz. |
| Red/Copper Reflective Pigment | 0.25-5 oz. |
| Light Gold Reflective Pigment | 0.25-5 oz. |
| Medium Gold Reflective Pigment | 0.25-5 oz. |
| White Pigment | 10-65 oz. |
| White/Pearl Reflective Pigment | 10-65 oz. |
| Silver Reflective Pigment | 10-65 oz. |
| Transparent Medium (Deep Base) | 10-40 oz. |
| Transparent Medium (Urethane) | 10-40 oz. |
| Water | 10-40 oz. |

EXAMPLE

A coating as described above, was prepared containing the following components:

| Component | Amount |
| --- | --- |
| Delta Ceramcoat Tompte Red | 1.35 oz. |
| Winsor & Newton Galeria Phthalo Green | 0.67 oz. |
| Delta Ceramcoat Phthalo Blue | 0.35 oz. |
| Delta Ceramcoat Antique Gold | 1.0 oz. |
| Delta Ceramcoat Metallic Red Copper | 1.35 oz. |
| Delta Ceramcoat Metallic Pale Gold | 1.35 oz. |
| Plaid Folk Art Metallic Inca Gold | 1.35 oz. |
| Behr Ultra Pure White Flat Acrylic Latex | 24 oz. |
| Delta Ceramcoat Pearl Finish | 42 oz. |
| Delta Ceramcoat Metallic Silver | 32 oz. |
| Behr Deep Base 1300 Acrylic Latex | 20 oz. |
| Minwax Polyacrylic Water Based Polyurethane Clear Satin | 24 oz. |
| Distilled Water | 20 oz. |

The components were mixed by conventional means. A projection screen was prepared by spraying the coating onto the surface of an acrylic mirror. The projection screen was placed adjacent to a conventional white projection screen and a sample image was simultaneously projected onto both screens using an Acer PD525 projector, under an ambient light intensity equivalent to 1,000 foot candles, 2,000 foot candles, 10,000 foot candles and 20,000 foot candles. In each case, the exemplary projection screen visually outperformed the conventional screen in terms of perceived brightness and contrast of the projected image.

FIG. 1 shows an image simultaneously projected onto a conventional white projection screen (left) and a projection screen having the exemplary coating, under ambient lighting conditions equivalent to 20,000 foot candles. As shown in FIG. 1, the projection screen on the right having the exemplary coating has dramatically improved performance with greater visibility and contrast in comparison to the conventional projection screen on the left.

It will be apparent to those of skill in the art that changes and modifications may be made in the embodiments illustrated herein, without departing from the spirit and scope of the invention.

What is claimed is:

1. A projection screen for displaying an image projected as a combination of primary colors, said projection screen including a coating for displaying said projected image and a substrate for receiving said coating, said coating comprising:
   one or more primary pigments, each said primary pigment corresponding to one of said primary colors;
   one or more reflective pigments; and
   a transparent medium;
   wherein said substrate is a clear material having opposite first and second surfaces, said coating located on said first surface and said second surface being a mirrored surface.

2. The projection screen of claim 1, wherein the distance between said first and second surfaces is not more than about 0.11 inches.

3. The projection screen of claim 1, wherein said coating further includes a flexative.

4. The projection screen of claim 1, wherein said coating further includes a thinning agent.

5. The projection screen of claim 1, wherein the thinning agent comprises water.

6. The projection screen of claim 1, wherein the one or more primary pigments comprise one or more acrylic paints.

7. The projection screen of claim 1, wherein said primary colors are red, blue, and green, and wherein the one or more primary pigments comprise a red pigment, a blue pigment, and a green pigment.

8. The projection screen of claim 1, wherein the one or more reflective pigments comprise a yellow reflective pigment and a red reflective pigment.

9. The projection screen of claim 1, wherein the one or more reflective pigments comprises a white pigment.

10. The projection screen of claim 9, wherein the white pigment comprises acrylic latex paint.

11. The projection screen of claim 1, wherein the one or more reflective pigments comprise mica.

12. The projection screen of claim 11, wherein the mica comprises white reflective mica particles and silver reflective mica particles.

13. The projection screen of claim 1, wherein the transparent medium is a urethane.

14. The projection screen of claim 13, wherein the urethane comprises polyurethane.

15. The projection screen of claim 1, wherein the one or more reflective pigments comprise metallic copper paint and metallic gold paint.

16. The projection screen of claim 1, wherein the substrate is flexible.

17. The projection screen of claim 1, wherein the clear material comprises glass.

18. The projection screen of claim 1, wherein the clear material comprises plastic.

19. The projection screen of claim 1, wherein the clear material is flat.

20. The projection screen of claim 1, wherein the clear material is curved.

* * * * *